Nov. 12, 1940.                J. F. KOVALSKY                2,221,588
                              REGULATING SYSTEM
                            Filed March 14, 1940
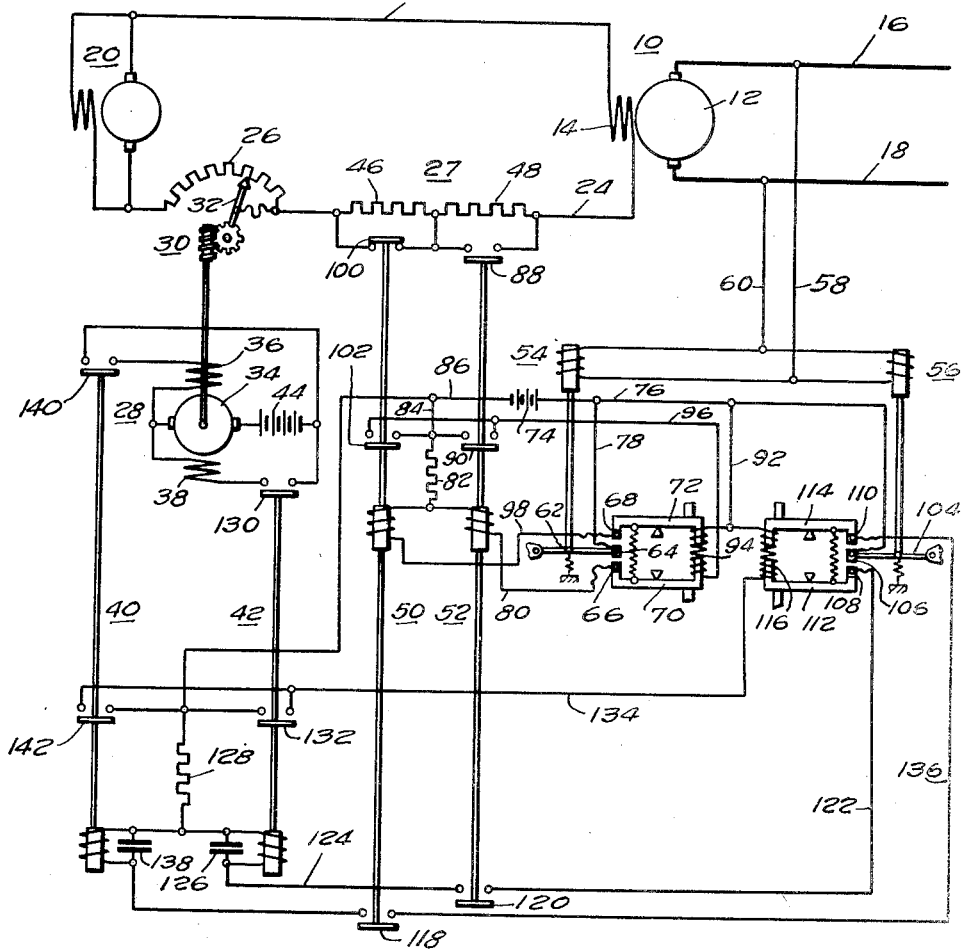
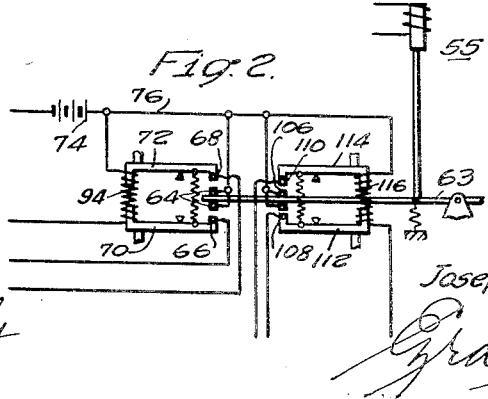
WITNESSES:                                              INVENTOR
                                                    Joseph F. Kovalsky.
                                                    BY
                                                              ATTORNEY Patented Nov. 12, 1940

2,221,588

UNITED STATES PATENT OFFICE 2,221,588

REGULATING SYSTEM

Joseph F. Kovalsky, Turtle Creek, Pa., assignor to Westinghouse Electric & Manufacturing Company, East Pittsburgh, Pa., a corporation of Pennsylvania Application March 14, 1940, Serial No. 323,929

7 Claims. (Cl. 171—229)

This invention relates to regulating systems, and particularly to regulating systems of the type employed with electrical apparatus subjected to changes in load.

In the usual type of regulating systems, a primary relay responsive to changes in voltage on a machine which is to be controlled is energized to close a circuit to effect a predetermined change in the amount of resistance in the energizing circuit of the machine. Where such regulating systems are employed to control the voltage on a machine employed in a plant where the application of load is of such a nature as to periodically reproduce momentary surges, it is found that the regulating system inherently introduces additional surges, since the corrective action of the regulating system for each surge must of itself be corrected or readjusted as soon as the load which causes the momentary surge is removed from the machine. Thus the regulating system is unsatisfactory, since twice as many surges as would ordinarily appear on any given machine occur and must be corrected.

The object of this invention is to provide for compensating for predetermined voltage changes on a dynamo-electric machine without operating the field rheostat.

Another object of the invention is to provide for actuating the field rheostat to control the field excitation when the auxiliary field forcing means for controlling the field excitation has been subjected to predetermined voltage changes.

Other objects of the invention will, in part, be obvious and will, in part, appear hereinafter.

The invention is disclosed in the embodiment thereof shown in the accompanying drawing which comprises the structural features the combination of elements and the arrangement of parts that will be exemplified in the structure hereinafter set forth and the scope of the application of which will be indicated in the claims.

For a fuller understanding of the nature and objects of the invention, reference should be had to the following detailed description taken in connection with the accompanying drawing, in which:

Figure 1 is a diagrammatic view of circuits and apparatus illustrating an embodiment of the regulating system of this invention, and Fig. 2 is a diagrammatic view of a modified form of a portion of the apparatus employed in the regulating system of Fig. 1.

Referring now to the drawing, the regulating system shown is provided for maintaining the voltage of the generator 10 substantially constant. The generator 10 is provided with an armature winding 12 and a field winding 14. As illustrated, the armature 12 is connected across a line comprising conductors 16 and 18, and the field winding 14 is connected to any suitable source of direct current. In this instance the source of direct current employed is an exciter generator 20 which may be driven in any suitable manner by a motor or other prime mover (not shown). The exciter 20 is connected by conductors 22 and 24 to the field winding 14. A motor operated field rheostat 26 and field forcing resistor 27 are connected in series circuit relation with the field winding 14.

A pilot motor 28 is provided for operating the rheostat 26 and is connected thereto by means of the worm and gear drive 30. The rheostat 26 is of any well known construction and is provided with a contact arm 32 which electrically engages the resistor element. The pilot or rheostat motor 28 is provided with an armature winding 34 and field windings 36 and 38. Relays 40 and 42 are connected in circuit relation with the field windings 36 and 38 to control the operation of the motor 28 from a battery 44 as will be explained more fully hereinafter.

In the embodiment illustrated the resistor 27 is divided into two sections 46 and 48. The section 46 is shunted by a back contact member carried by a relay 50. Another relay 52 is disposed to shunt the resistor 48.

Since it is desired to control the operation of the relays 40, 42, 50 and 52 in accordance with changes in the voltage across the line conductors 16 and 18, two primary relays 54 and 56 are provided having their operating windings connected by conductors 58 and 60 to the line conductors 16 and 18 whereby they are energized in accordance with the voltage of the generator 10.

The energization of actuating coil of relay 54 changes with the voltage on the generator 10 and will either raise or lower a contact carrying arm 62 having contact members 64 thereon. The relay 54 is disposed to support the arm 62 in its central position between contact members when a predetermined voltage is on the generator 10.

The primary relay 54 is so adjusted and disposed as to control the shunting of the sections 46 and 48 of the field forcing resistor 27 by the relays 50 and 52. In order to control the action of the relays 50 and 52, cooperating contact members 66 and 68 carried by movable arms 70 and 72, respectively, are disposed to be engaged by contact members 64.

If the voltage of the generator 10 decreases from rated value, the energization of the actuating coil of relay 54 is decreased and the arm 62 swings downwardly and the contact member 64 engages contact member 66, closing a circuit which may be traced from the battery 74 through conductors 76 and 78, contact members 64 and 66, conductor 80, the actuating coil of the relay 52, resistor 82, conductors 84 and 86, back to the battery 74. When the actuating coil of the relay 52 is energized, the relay actuates contact member 88 to shunt resistor section 48, thus increasing the voltage applied to the field winding 14 of the generator 10. At the same time, contact member 90 closes a circuit which extends from the battery 74 through conductors 76 and 92, actuating winding 94 for the movable members 70 and 72, conductor 96, contact member 90 through conductors 84 and 86, back to the battery 74. The winding 94 is thus energized to actuate the movable members 70 and 72 to tend to separate the contact member 66 from the member 64.

The construction of the portion of the apparatus comprising the movable arms 70 and 72, the energizing winding 94 and the functioning of such device to separate the contact members 64 and 66 to prevent hunting is clearly disclosed in my Patent No. 2,121,601, dated June 21, 1938. With this structure it is apparent that if the change in the voltage on the generator 10 is small, the energization of the actuating winding 94 will effect the separation of the contact members 64 and 66, deenergizing the relay 52, whereby the resistor section 48 is again in series circuit relation with the field winding 14. However, if the decrease in the voltage on the generator 12 is of large value, then the movable contact carrying arm 62 is dropped to its lowermost position so that regardless of the movement of the arm 70 in response to energization of the actuating winding 94, the contact members 64 and 66 stand engaged, thus maintaining the energization of the relay 52 to shunt the resistor section 48.

In like manner, if the voltage on the generator 10 increases, the primary relay 54 is energized to actuate the contact carrying arm 62 upwardly to effect an engagement of contact member 64 with the contact member 68 on the movable arm 72, whereby a circuit is closed which extends from the battery 74 through conductors 76 and 78 and contact members 64 and 68, conductor 98, actuating coil of relay 50, resistor 82 and conductors 84 and 86, back to the battery 74. The actuating coil of relay 50 is energized and relay 50 is actuated, raising contact member 100 whereby resistor section 46 is connected in series circuit relation with the field winding 14, reducing the voltage applied to the field winding 14.

The relay 50 functions similarly to the relay 52 in that another contact member 102 is actuated to close a circuit extending from the battery 74 through the conductors 76 and 92, winding 94, conductor 96, contact member 102 and conductors 84 and 86, back to the battery 74. The winding 94 is thus energized to actuate the movable members 70 and 72 tending to separate the contact members 64 and 68 in a manner hereinbefore described with respect to the separation of contact members 64 and 66.

In practice, the primary relays 54 and 56 are of substantially the same construction, the only difference being that relay 54 is responsive to a larger change in the voltage on generator 10 than the relay 56. In a commercial installation, the relay 54 is set to respond to a change in voltage of plus or minus .5%, whereas the relay 56 is set to respond to a change of plus or minus .4%, the reasons for which will be explained more fully hereinafter.

The primary relay 56 is provided for initiating a circuit to control the actuation of secondary relays 40 and 42 which, in turn, control the operation of the field rheostat motor 28. As illustrated, the relay 56 functions to either raise or lower a contact carrying arm 104 having contact members 106 thereon into engagement with either contact member 108 or contact member 110 carried by the movable arms 112 and 114, respectively, depending upon whether or not the voltage change on the generator 10 is a decrease or an increase. The structure and functioning of the movable arms 112 and 114 and the winding 116 are similar to the structure associated with the primary relay 54.

In order to control the operation of the field rheostat motor 28 when a change of the voltage on the generator 10 is encountered, auxiliary control means comprising the contact members 118 and 120 are carried by the relays 50 and 52. Since the contact members 118 and 120 are actuated to their circuit closing position when the relays 50 and 52 are actuated to control the sections of resistor 28 in the field circuit, it is apparent that the motor 28 cannot be operated until after the actuation of relay 50 or 52 to control the field forcing resistor 28. Further, since the relays 54 and 56 are designed to be responsive to changes in voltage of .5 and .4%, respectively, or other corresponding changes in voltage, a positive action of the field forcing relay 50 or 52 is secured before a circuit is established to control the operation of the motor 28.

Thus in order to operate the motor 28 to correct for a prolonged surge or change of the voltage on the generator 10, or for such a large change that cannot be corrected by a change in the field forcing resistor 28, the relays 50 and 52 cooperate with the primary relay 56 to close a circuit to energize the actuating coil of relay 40 or 42 depending upon whether the change in the voltage on the generator 10 is an increase or a decrease.

Assuming that a decrease in the voltage of the generator 10 is encountered and that this decrease is only .4%, the actuating coil of the relay 56 is deenergized to cause the contact carrying arm 104 to drop, effecting the engagement of contact members 106 and 108. Under this condition, a circuit will not be closed to energize the secondary relay 42, since the change in voltage on the generator 10 is insufficient to energize the actuating coil of relay 54 to effect the actuation of relay 52 to its circuit closing position. However, if the decrease in voltage is .5% or larger then both of the primary relays 54 and 56 are actuated and a circuit is closed to effect the actuation of the relay 52 to give a positive field forcing action by reason of the contact member 88 shunting the resistor 48.

When the actuating coil of relay 52 is energized, the auxiliary contact member 120 is also actuated to a circuit closing position, whereby a circuit is closed extending from the battery 74, through conductor 76, contact members 106 and 108, conductor 122, contact member 120, conductor 124, through the operating winding of relay 42 and condenser 126 in parallel circuit relation therewith, resistor 128 and conductor 86, back to the battery 74.

The closing of the circuit by the contact member 120, however, does not instantaneously effect the actuation of relay 42 to close the circuit to energize the motor 28 since the heavy inrush of current through the condenser 126 produces a high drop across the resistor 128 with a corresponding zero voltage across the actuating coil of relay 42 until the condenser 126 becomes charged to a predetermined value. In practice, the resistor 128 and condenser 126 are so constructed as to provide a time delay of one to two seconds before the condenser is charged to the predetermined value. Thus if the positive field forcing action of the relay 52 is sufficient to correct for the change in voltage on the generator 10 or if the change in voltage lasts for less than the time delay necessary for charging the condenser 126 to the predetermined value, relay 42 will not be actuated to its circuit closing position.

If the change in voltage on generator 10 persists, actuating coil 94 is energized to effect the separation of contact members 64 and 66 to deenergize the actuating coil of relay 52. Thus under the action of relay 54 and the anti-hunting coil 94, relay 52 functions in the manner of a vibrating contactor during the period of time for which the change in voltage on the generator 10 persists. The contact member 120 is thus vibrated into and out of its circuit closing position and the condenser 126 will not be charged to the predetermined value unless the change in voltage on the generator persists for a period of time longer than the time delay setting of the resistor 128 and condenser 126.

If the change in the voltage on the generator 10 lasts until, under the vibrating action of relay 52, the condenser 126 becomes charged to the predetermined value, then the current is divided between the condenser and the actuating coil of relay 42 so that the actuating coil is energized to actuate the relay 42 to its circuit closing position. With the relay 42 in its circuit closing position, contact member 130 of the relay 42 closes a circuit extending from the battery 44, through the field winding 38 and armature 34, back to the battery, thereby energizing the motor 28.

It is to be noted, however, that when the relay 42 is actuated to close a circuit to energize the motor 28, another contact member 132 carried by the relay 42 is actuated to close a circuit which may be traced from the battery 74, through conductors 76 and 92, winding 116, conductor 134, contact member 132 and conductor 86, back to the battery 74. The winding 116 is thus immediately energized to tend to effect the separation of the contact members 106 and 108 to interrupt the energizing circuit of the operating winding of relay 42. However, the charge of the condenser 126 is sufficient to hold the relay 42 in its circuit closing position for a period of time sufficient to permit operation of the motor 28 to effect a change of one step in the setting of the field rheostat 26. Further changes in the setting of the field rheostat 26 will be effected in a like manner if the one step change is not sufficient to correct for the change in voltage on the generator 10.

The motor 28 is also energized to effect a change in the setting of the field rheostat 26 if the change of the voltage on the generator 10 is of sufficient value that the energization of the anti-hunting windings 94 and 116 is insufficient to effect a separation of the contact members carried by the contact carrying arms 62 and 104 and their associated movable members 70 and 72 and 112 and 114, respectively.

The motor 28 is also energized if the change in the voltage on generator 10 is an increase of sufficient value to effect the energization of the operating windings of primary relays 54 and 56 to actuate the contact carrying arms 62 and 104 in an upward direction to engage their associated contact members 68 and 110. Thus with the operating winding of the relay 50 energized and the auxiliary contact member 118 actuated to its circuit closing position, a circuit is closed extending from the battery 74, through conductor 76, contact members 106 and 108, conductor 136, contact member 118, operating winding of relay 40 and condenser 138 in parallel circuit relation therewith, resistor 128 and conductor 86, back to the battery 74. The condenser 138 and resistor 128 cooperate to give a time delay similar to the time delay action of condenser 126 and resistor 128 associated with relay 42, whereby the actuating coil of relay 40 is not energized until condenser 138 is charged to a predetermined value. When the condenser is thus charged, the actuating coil of relay 40 is energized.

When the operating winding of relay 40 is energized, contact member 140 of the relay 40 closes a circuit which extends from the battery 44 through the contact member 140, field winding 36 and armature 34, back to the battery 44, to energize the field rheostat motor 28. Simultaneously with the closing of the motor operating circuit, contact member 142 carried by relay 40 is actuated to close a circuit extending from the battery 74 through conductors 76 and 92, actuating winding 116, conductor 134, contact member 142 and conductor 86, back to the battery 74 to energize the anti-hunting winding 116. The conditions for actuating relays 50 and 40 are the same as those necessary for the actuation of relays 52 and 42, except that they are dependent upon an increase in the voltage on generator 10 as distinguished from a decrease of the voltage on the generator which is necessary for operation of the relays 52 and 42.

Although in the embodiment described hereinbefore two primary relays 54 and 56 are employed, it is quite apparent that the same functioning of the regulating system described can be obtained through the use of only one primary relay. Such modification is illustrated in Fig. 2, in which a primary relay 55 having an actuating coil is responsive to changes in the voltage on the generator 10 for controlling the movement of a contact carrying arm 63.

In this modification, the contact carrying arm 83 is common to both sets of the movable arms 70 and 72 and 112 and 114, respectively. By employing only one primary relay 55, simplification of the apparatus may be secured. Under this condition the primary relay 55 is responsive to a voltage change of at least .4% corresponding to the change necessary for energizing the primary relay 56 of the illustration embodied in Fig. 1. However, in order that the same relation for changing the field forcing resistor 27 and the field rheostat 26 may be secured, the movable arms 70 and 72 are so positioned and set with respect to the contact member 64 on the contact carrying arm 61 that the contact member 64 will not engage either of the contact members 66 and 68 unless a movement of the contact carrying arm 61 is secured which corresponds to a change of .5% instead of the .4% change in voltage which effects the engagement of contact member 106 with contact member 108 or 110. An actuation of the relay 50 or 52 to effect a change in the field forcing resistor 27 is secured before the relay 40 or 42 is actuated to effect the energization of the motor 28.

By providing the regulating system of this invention, it is quite apparent that a change in the setting of the field rheostat will not be secured until after the field forcing action has taken place, nor will the change in the setting of the field rheostat occur unless the change in the field forcing resistor is insufficient to correct for the change of the voltage on the generator. It is further seen that, by reason of the auxiliary contact members and the inclusion of the condensers associated with the operating windings of the relays which control the operation of the field rheostat motor, the change in the setting of the field rheostat is dependent upon the operation of the relays for securing the change in the field forcing resistor, and that in all cases the field forcing action is secured prior to any change in the setting of the field rheostat.

Many modifications in the apparatus and circuits illustrated and described may be made within the spirit of this invention, and it is, therefore, desired that this invention be not limited other than by the scope of the appended claims.

I claim as my invention:

1. In a regulating system for dynamo-electric machines provided with a field winding, in combination, a rheostat connected in circuit relation with the field winding to control the field excitation of the dynamo-electric machine, a motor for operating the rheostat, means responsive to changes in voltage on the dynamo-electric machine for initiating and controlling the operation of the motor, a resistor connected in circuit relation with the field winding, means for shunting the resistor disposed to operate in response to voltage changes on the dynamo-electric machine to control the excitation, and means dependent upon the operation of the resistor shunting means for controlling the operation of the rheostat motor to control the excitation of the dynamo-electric machine.

2. In a regulating system for dynamo-electric machines provided with a field winding, in combination, a rheostat connected in circuit relation with the field winding to control the field excitation of the dynamo-electric machine, a motor for operating the rheostat, means responsive to changes in voltage on the dynamo-electric machine for initiating and controlling the operation of the motor, a resistor connected in circuit relation with the field winding, means for shunting the resistor disposed to operate in response to voltage changes on the dynamo-electric machine to control the excitation, and means associated with the resistor shunting means for preventing operation of the rheostat motor until after the operation of the resistor shunting means.

3. In a regulating system for dynamo-electric machines provided with a field winding, in combination, a rheostat connected in circuit relation with the field winding to control the field excitation of the dynamo-electric machine, a motor for operating the rheostat, means responsive to changes in voltage on the dynamo-electric machine for initiating and controlling the operation of the motor, a resistor connected in circuit relation with the field winding, means for shunting the resistor disposed to operate in response to voltage changes on the dynamo-electric machine to control the excitation, means associated with the resistor shunting means for preventing operation of the rheostat motor until after the operation of the resistor shunting means, and means in circuit relation with the motor controlling means to assure operation of the motor in response to a predetermined voltage change on the dynamo-electric machine after the operation of the resistor shunting means.

4. In a regulating system for dynamo-electric machines provided with a field winding, in combination, a rheostat connected in circuit relation with the field winding to control the field excitation of the dynamo-electric machine, a motor for operating the rheostat, a resistor connected in circuit relation with the field winding, means for shunting the resistor to control the excitation of the dynamo-electric machine, means responsive to changes in voltage on the dynamo-electric machine to initiate and control the operation of the resistor shunting means and the operation of the motor, and means associated with the resistor shunting means to assure operation of the resistor shunting means before operation of the motor.

5. In a regulating system for dynamo-electric machines provided with a field winding, in combination, a rheostat connected in circuit relation with the field winding to control the field excitation of the dynamo-electric machine, a motor for operating the rheostat, a resistor connected in circuit relation with the field winding, means for shunting the resistor to control the excitation of the dynamo-electric machine, means responsive to changes in voltage on the dynamo-electric machine to initiate and control the operation of the resistor shunting means and the operation of the motor, and means dependent upon the operation of the resistor shunting means for controlling the operation of the rheostat motor to control the excitation of the dynamo-electric machine.

6. In a regulating system for dynamo-electric machines provided with a field winding, in combination, a rheostat connected in circuit relation with the field winding to control the field excitation of the dynamo-electric machine, a motor for operating the rheostat, a resistor connected in circuit relation with the field winding, means for shunting the resistor, means responsive to predetermined variations in the voltage on the dynamo-electric machine to operate the resistor shunting means to control the excitation, means responsive to predetermined variations in the voltage on the dynamo-electric machine of less value than the variations necessary to operate the resistor shunting means to control the operation of the rheostat motor, and means associated with the resistor shunting means and cooperative with the means responsive to the predetermined variations of less value in the voltage to render the means responsive effective to control the operation of the motor.

7. In a regulating system for dynamo-electric machines provided with a field winding, in combination, a rheostat connected in circuit relation with the field winding to control the field excitation of the dynamo-electric machine, a motor for operating the rheostat, a resistor connected in circuit relation with the field winding, means for shunting the resistor, means responsive to predetermined variations in the voltage on the dynamo-electric machine to operate the resistor shunting means to control the excitation, means responsive to predetermined variations in the voltage on the dynamo-electric machine of less value than the variations necessary to operate the resistor shunting means to control the operation of the rheostat motor, means associated with the resistor shunting means and cooperative with the means responsive to the predetermined variations of less value in the voltage to render the means responsive effective to control the operation of the motor, and means in circuit relation with the means responsive to the predetermined variations of less value to assure the operation of the rheostat motor when the associated means cooperates with the means responsive to the variations of less value if the variations persist above the predetermined value necessary to operate the resistor shunting means.

JOSEPH F. KOVALSKY.